United States Patent [19]
Clawson

[11] 3,802,249
[45] Apr. 9, 1974

[54] METHOD AND APPARATUS FOR CHECKING FIRE DETECTORS

[75] Inventor: George T. Clawson, Seabrook, Md.

[73] Assignee: The United States of America as represented by the Administrator of the National Aeronautics and Space Administration, Washington, D.C.

[22] Filed: Dec. 26, 1972

[21] Appl. No.: 318,357

[52] U.S. Cl.................................................. 73/1 F
[51] Int. Cl. .......................................... G01k 15/00
[58] Field of Search................ 73/1 F; 340/214, 410

[56] References Cited
UNITED STATES PATENTS

| | | | |
|---|---|---|---|
| 2,854,844 | 10/1958 | Howell | 73/1 F |
| 2,993,363 | 7/1961 | Howell | 73/1 F |
| 3,067,604 | 12/1962 | Brunson | 73/1 F |

*Primary Examiner*—Donald O. Woodiel
*Attorney, Agent, or Firm*—R. F. Kempf; E. Levy; John R. Manning

[57] ABSTRACT

A fire detector checking method and device are disclosed for nondestructively verifying the operation of installed fire detectors of the type which operate on the principle of detecting the rate of temperature rise of the ambient air to sound an alarm and/or which sound an alarm when the temperature of the ambient air reaches a preset level. The fire alarm checker device of the instant invention uses the principle of effecting a controlled simulated alarm condition to ascertain whether or not the detector will respond. In the preferred embodiment, the checker comprises a hand-held instrument employing a controlled heat source, e.g., an electric lamp having a variable input, for heating at a controlled rate an enclosed mass of air in a first compartment, which air mass is then disposed about the fire detector to be checked. A second compartment of the device houses an electronic circuit to sense and adjust the temperature level and heating rate of the heat source. Actuation of a fire detector of the rate of rise type within a predetermined time interval after applying the heated air mass thereto verifies the soundness of the system. A technique is further disclosed whereby a test for proper operation at a predetermined temperature level may separately or alternatively be performed by the novel device on fire detectors which are triggered at some predetermined temperature level irrespective of the rate of temperature rise.

10 Claims, 4 Drawing Figures

METHOD AND APPARATUS FOR CHECKING FIRE DETECTORS

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention generally relates to fire alarm systems and particularly concerns a fire detector checking method and apparatus for verifying the operation and integrity of fire alarm detectors of a type which operate on the principle of detecting the rate of temperature rise of the ambient air to sound an alarm, and/or which sound an alarm when the temperature of the ambient air reaches a preset level.

Conventional fire detectors embody means which react to changes of ambient pressure, caused by an increase in air temperature. Such means typically take the form of a disphragm which, upon deflection, actuates a pair of electrical contacts connected to the alarm system, the diaphragm being mounted between two enclosed chambers and being provided with a calibrated aperture which allows stabilization of pressures between the two chambers when the rate of temperature rise in the surrounding ambient air is less than the rate of rise at which the alarm is designed to go off. Increased pressure applied to one side of the diaphragm at a high rate of rise causes the diaphragm to bulge into the other chamber since the calibrated aperture cannot instantaneously and quickly enough equalize the pressures, with the result that the diaphragm actuates a pair of alarm contacts.

While the diaphragms per se can be tested during and after their manufacture for deflection under known values of pressure as an indication of operational integrity of the fire alarm detector, there has been no simple and ready method of ascertaining the operational integrity of the overall fire detector device as installed in a working system without actually creating local conditions of fire, or alternatively, using other elaborate and expensive means of checking the installation.

Similar problems are encountered in checking the operational reliability of fire detectors which actuate an alarm when the temperature of the ambient air reaches a preset level, irrespective of or in association with the rate of temperature rise. Detectors of this type typically utilize bimetallic contacts much in the fashion of conventional thermostats.

SUMMARY OF THE INVENTION

It is thus apparent that a need still exists in the art for a convenient and economical device by which one can verify in situ the operation and integrity of installed fire detectors. It is the primary object of the present invention to provide a new and novel device for the aforesaid purpose.

It is a further objective of the present invention to provide a technique and device which can be readily applied to check the operation of an installed fire detector for a predetermined and known rate of temperature rise.

It is still another objective of the present invention to provide a technique and device for checking the soundness of operation of an installed fire detector at a predetermined temperature level.

It is yet another objective of the present invention to provide a device for the purpose described, which device is portable, and which may be held with one hand, and which utilizes and existing main power source for the operation thereof.

These objects, as well as others which will become apparent as the description proceeds, are implemented by the provision of a novel fire detector checking device which provides a plenum in the form of an enclosed mass of air which is heated at a controlled rate of temperature rise and which is applied to the fire detector to be checked. In other words, the checking device of the invention, in a very simple yet novel manner, can simulate the rate of temperature rise condition and/or temperature level which would occur in case of a fire, at which condition the fire detector is intended to operate.

In a preferred embodiment of the instant invention, the fire detector checking device comprises a housing which is divided into two compartments, the first compartment containing a controlled heat source, the second compartment containing means to control the temperature level of the heat source disposed in the first compartment. The means to control the temperature level of the heat source expediently cooperates with a secondary circuit and an indicating meter so as to indicate to the operator the selected temperature level of the heat source, irrespective of the fluctuations in power source to the heat source. Said first compartment provides a plenum of air and includes an open end face which may be applied over the fire detector which is to be checked for operation. While the end face of the first compartment is applied over the fire detector, the enclosed volume of air in the first compartment is heated by the controlled heat source. With a fire alarm detector of the rate of temperature rise type described above, for example, an increased pressure is applied against its diaphragm because of the expanding air within its internal compartment, and if the rate of temperature rise produced by the checking device as communicated by pressure to the detector diaphragm is of such a value that the pressure cannot be handled and equalized by the calibrated aperture in the diaphragm, the diaphragm deflects thereby actuating a pair of fire alarm contacts and sounding the alarm.

A secondary circuit to sense and indicate the temperature level of the heat source cooperates with the heat source so as to enable an operator to select a desired rate of temperature rise setting on the device, irrespective of fluctuations and variations in the power source level to the heat source.

Using a preselected rate of temperature rise value, the device of the present invention can be applied to an installed fire detector to ascertain the correct operation of the detector within an allowable interval of time. Furthermore, the inventive device may also be applied on an installed detector to check its operation against any selected level of temperature, irrespective of its rate of temperature rise.

When a plurality of fire detectors having different calibrations and settings have to be successively checked for correctness of operation using the checking device of the invention, it is desirable to allow a sufficient cooling period between successive measurements and tests in order to enable the device to return to substantially ambient conditions before commencement of each test.

The checking device of the invention can conveniently be used by fire underwriters and maintenance inspectors for nondestructively verifying the operation and integrity of virtually any installed fire alarm system of all common types.

BRIEF DESCRIPTION OF THE DRAWINGS

The invention itself will be better understood and additional features and advantages thereof will become more apparent from the following detailed description of a preferred embodiment of the invention, such description being read in conjunction with the appended drawings, wherein.

DETAILED DESCRIPTION OF THE PREFERRED INVENTIVE EMBODIMENT

Figure 1:
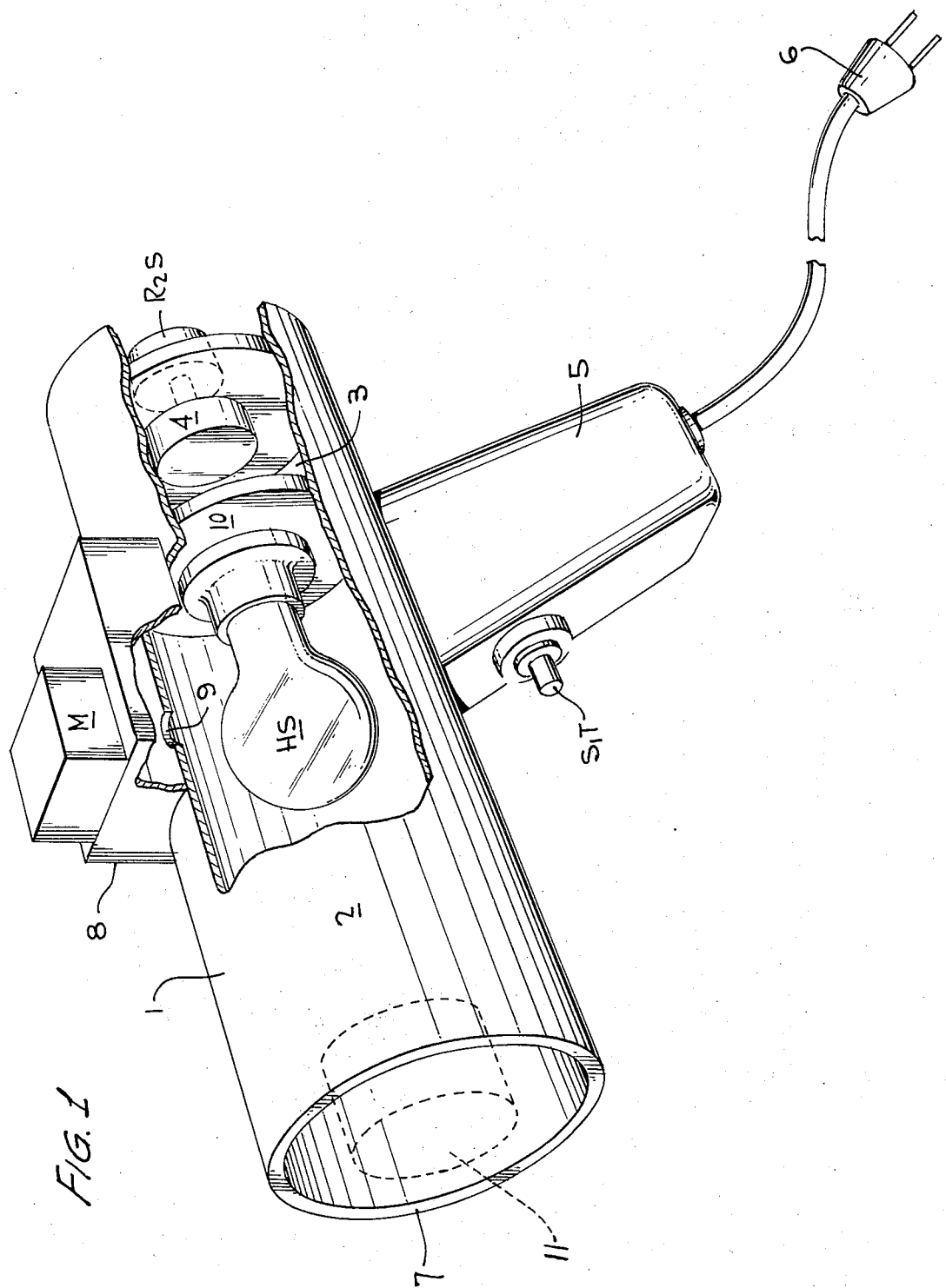
FIG. 1 is a diagrammatic illustration in part section, of the fire detector checking device.

Referring now to the drawings, in particular to FIG. 1 thereof, the fire detector checking device comprises a housing 1, which may be metallic, or alternatively made of a synthetic material. In the operative embodiment illustrated, housing 1 preferably comprises a metal cylinder approximately 4 ¾ inches in diameter and 16 inches long. A first compartment 2 of the housing 1 contains a heat source HS, which in the preferred embodiment comprises an incandescent lamp. An end face 7 of the first compartment is open to atmosphere and is intended to be applied against and over a fire detector 11 illustrated in dotted line which is to be checked for operation. A second compartment 3 separated from the first compartment by a barrier 10 may be approximately 4 inches long and houses an electronic control means 4 including a control knob $R_2S$. A casing 8 is disposed on the housing 1 adjacent heat source HS, and employs means as depicted in detail in FIG. 2b to measure the incandescence of the heat source HS so that the required rate of temperature rise of the device may be set prior to a test, irrespective of the fluctuations in the supply voltage to the heat source. The housing 1 is provided with a pistol grip handle 5 so as to enable a convenient handling of the device and easy positioning thereof on the fire detector 11 to be checked.

An on-off trigger switch $S_1T$ is provided on the pistol grip handle 5, and a power supply cord 6 serves to connect the heat source and the associated electronic control means 4 to a main power source.

Figure 2A:
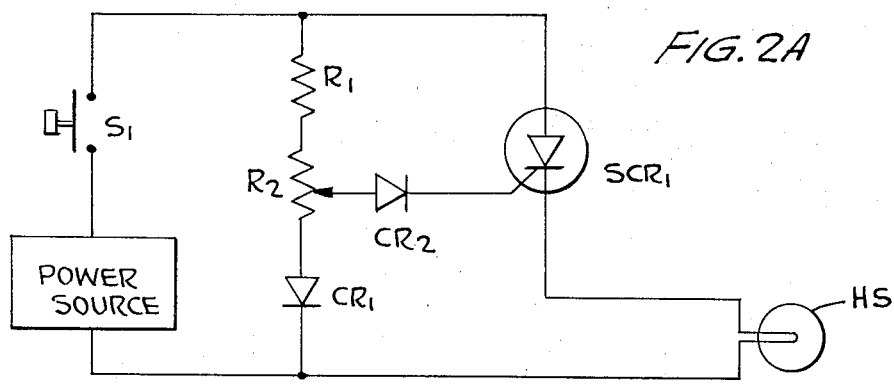
FIG. 2a is an exemplary electrical circuit feeding the heat source of the checking device of the present invention.

With reference to FIG. 2a, the incandescent lamp with constitutes the heat source in the preferred embodiment, is preferably connected to a main power source through a silicon controlled rectifier $SCR_1$ and a trigger switch contact $S_1$. A series network of a variable resistance, such as resistor $R_2$, resistor $R_1$, and diode $CR_1$ is connected across the power source. $R_2$ is coupled to the control knob $R_2S$ illustrated in FIG. 1. The gate of the silicon controlled rectifier $SCR_1$ is connected to the wiper arm of variable resistor $R_2$ through a diode $CR_2$. The desired value of the resistor $R_2$ may be set by the operator, and the trigger switch contact $S_1$, which is coupled to ON-OFF trigger switch $S_1T$ (FIG. 1), is closed to supply controlled power to the incandescent lamp HS during a measuring and testing operation.

Figure 2B:
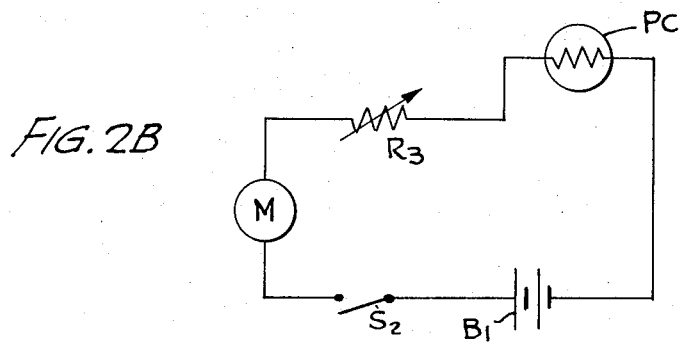
FIG. 2b is a secondary and optional in circuit operating an conjunction with the heat source, so as to give the operator an indication of the selected rate of temperature rise irrespective of supply voltage variations.

Referring now to FIG. 2b, a secondary circuit constituted by a photocell PC, a battery B, a switch $S_2$, a meter M, and an adjustable resistor $R_3$, enables the operator to select and monitor the desired rate of temperature rise irrespective of supply voltage fluctuations in the incandescent lamp circuit. To this end, as shown in FIG. 1, light radiations from the incandescent lamp are received by the photocell PC through an aperture or window 9 in the housing 1, and the intensity of the received light radiation, which is a measure of the rate of temperature rise selected, is indicated on the calibrated meter M. Therefore, if the required rate of temperature rise is known in terms of the reading on the meter M, the operator initially closes the trigger switch $S_1T$ and adjusts the control knob $R_2S$ until the required reading on the meter M is obtained.

The embodiment illustrated preferably uses a 100 watt incandescent light bulb, this size of bulb being selected based on calculations showing a requirement of approximately 44 watts input to raise the temperature of 0.123 cubic feet of air at the rate of 15°F. per minute. This is, of course, based on the enclosed volume of the cylinder housing the incandescent bulb, namely, the cylindrical volume constituted by the cylinder of 4 ¾ inches diameter and 12 inches length. It is to be noted that the size and nature of the heat source are by no means unique and can be suitably chosen depending on the individual requirement and application of the fire alarm checker device, as can be appreciated by one who is skilled in the art.

The rate of rise fire detector checking device of the present invention functions as follows, for purposes of checking the operation of rate of temperature rise type of fire detectors.

The device is plugged into the main power source such as of 115 volts and 60 cycles. The open end face 7 of the first compartment is closed in any convenient manner and the trigger switch $S_1T$ on the piston grip 5 is closed. The control knob $R_2S$ at the rear of the second compartment 3 is adjusted until, for example, the meter M located on the casing 8 at the top of the device reads along level set or rate of rise curve 5, indicating a 15° per minute rate of temperature rise as indicated by the graphical illustration of FIG. 3. The particular level set or rate of rise curve is selected in accordance with the characteristics of the particular fire detector being checked, and may be varied as desired by the operator to fall on curve 1, curve 5, or any other curve or level set deemed suitable. The trigger switch is now released and the device is set and ready for disposing about a fire detector. The open end face 7 of the first compartment is applied over and surrounding the fire detector and the trigger switch $S_1T$ is pressed again, and time is then counted in seconds. If the fire detector is normal and is operating properly, an alarm associated with the fire detector should be activated in approximately 40 seconds with the example under consideration here. By re-setting the control knob R₂S until a meter reading or level set of 1 on the meter M is obtained, a repeat of this test should not cause the particular detector to set off the alarm, because a rate of approximately 8° to 10° temperature rise per minute is established by choosing a meter reading or level set of 1 on meter M, this rate being insufficient to activate the particular alarm.

Figure 3:
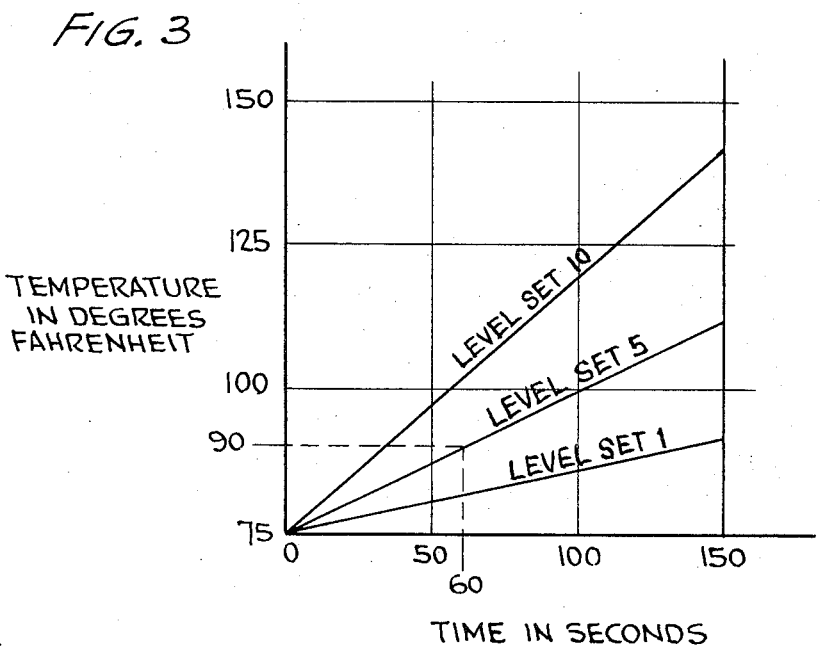
FIG. 3 illustrates typically calibration curves showing temperatures at which the checking device causes operation of a typical fire detector, against varying time.

If the checking device is to be used to ascertain the operation of a fire detector of the bimetallic contact strip type which is actuated at a predetermined temperature level irrespective of rate of temperature rise, the checking device would first be adjusted as explained above to obtain a meter reading or level set of 1. This will, as stated above, give a temperature rate of rise of approximately 8° to 10° per minute. The open end face 7 of the first compartment is applied over the fire detector, and the trigger switch $S_1T$ is depressed again and held in the same state for approximately two minutes. Then, the temperature of the heat source HS is raised full by operating the control knob R₂S. This will cause the temperature inside the first compartment to be raised from approximately 124° F. to 140° F. as shown in FIG. 3, causing the bimetallic detector-contacts to operate, which contacts are adjusted to operate at 135° F., so as to actuate the fire alarm.

The scope and application of the present invention are by no means limited to the preferred illustrated embodiment of the invention which is only exemplary, and is to be construed by the appended claims. Accordingly,

What is claimed is:

1. A checking device for checking the operation of an installed fire detector, comprising: a casing having therein a plenum which is to be applied over the fire detector to be checked; an adjustable heat source disposed within said casing to effect predetermined temperature characteristics, defined by a predetermined rate of temperature rise, within said plenum; and means for measuring said temperature characteristics from radiation emitted by said heat source, whereby a normal and faultless fire detector to which said device is applied, after setting said predetermined temperature characteristics, sets off an alarm within a given interval of time.

2. A checking device as in claim 1, wherein said heat source comprises electrical resistance, said device including means to control a power source to the heat source so as to achieve a predetermined rate of temperature rise of said plenum.

3. A checking device as in claim 2, wherein said means to control the power source to the heat source comprises a silicon controlled rectifier and a variable resistor connected in the gate circuit of said silicon controlled rectifier.

4. A device as in claim 2, in which said casing is provided with a pistol grip enabling the device to be handheld, said pistol grip including a trigger switch, said trigger switch being connected electrically to said power source.

5. A device as in claim 4, wherein said radiation-sensing element which is disposed to receive radiation from said heat source comprises a photocell.

6. A device as in claim 2, wherein said means to control power source to heat source comprises a silicon controlled rectifier and a variable resistance connected in the gate circuit of said silicon controlled rectifier.

7. A checking device as in claim 1, wherein said heat source comprises an incandescent lamp, and wherein said radiation which is measured comprises light radiation.

8. A device as in claim 4, wherein said means for measuring comprises a meter connected in series with a photocell which is disposed to receive light radiation from said incandescent lamp.

9. A method of determining the operational integrity of an installed fire detector, said method comprising the steps of:
applying a plenum over the fire detector to be checked;
heating the plenum at a controlled rate by a radiation-emitting heat source;
measuring the rate of temperature rise within the plenum by monitoring the radiation emitted by the heat source;
adjusting the rate of heating of the heat source so that the rate of temperature rise within the plenum corresponds to predetermined ratings of the fire detector being checked, thus simulating an alarm condition; and
determining whether the fire detector responds to the simulated alarm condition.

10. In an apparatus for checking the operational reliability of an installed fire detector which includes an incandescent heat source for applying heat to the fire detector thereby simulating an alarm condition, the improvement comprises means for measuring the temperature of the heat source by monitoring the radiation emitted therefrom, and means for adjusting the output of the heat source so that said measured temperature corresponds with predetermined characteristics of the fire detector.

* * * * *